(12) United States Patent
Clark

(10) Patent No.: US 6,948,695 B1
(45) Date of Patent: Sep. 27, 2005

(54) MOLDS FOR CASTING FISHING LURES AND OTHER PRODUCTS

(75) Inventor: Michael R. Clark, Pineville, LA (US)

(73) Assignee: Knight Manufacturing Co., Inc., Tyler, TX (US)

( * ) Notice: Subject to any disclaimer, the term of this patent is extended or adjusted under 35 U.S.C. 154(b) by 349 days.

(21) Appl. No.: 10/368,022

(22) Filed: Feb. 19, 2003

Related U.S. Application Data

(62) Division of application No. 10/116,937, filed on Apr. 8, 2002, now Pat. No. 6,678,992, which is a division of application No. 09/802,771, filed on Mar. 12, 2001, now Pat. No. 6,408,567.

(51) Int. Cl.[7] .............................. B28B 7/36; B29C 33/56
(52) U.S. Cl. ....................... 249/114.1; 43/4; 43/17.2; 43/42.05; 425/546; 264/300
(58) Field of Search .............................. 249/114.1, 134; 43/42.06, 42.24

(56) References Cited

U.S. PATENT DOCUMENTS

| | | | | |
|---|---|---|---|---|
| 2,983,570 A | * | 5/1961 | Lux | 428/307.3 |
| 4,587,287 A | * | 5/1986 | Matsuda et al. | 524/404 |
| 5,288,443 A | * | 2/1994 | Lee | 264/651 |
| 5,494,432 A | * | 2/1996 | Coggins et al. | 425/546 |
| 5,689,910 A | * | 11/1997 | Kato | 43/42.24 |

\* cited by examiner

Primary Examiner—Benjamin L. Utech
Assistant Examiner—G. Nagesh Rao

(57) ABSTRACT

A soft plastic fishing lure or other product may be made to float by incorporating air bubbles therein by molds that draw air from inside the molds in which the lures or products are cast.

20 Claims, 5 Drawing Sheets

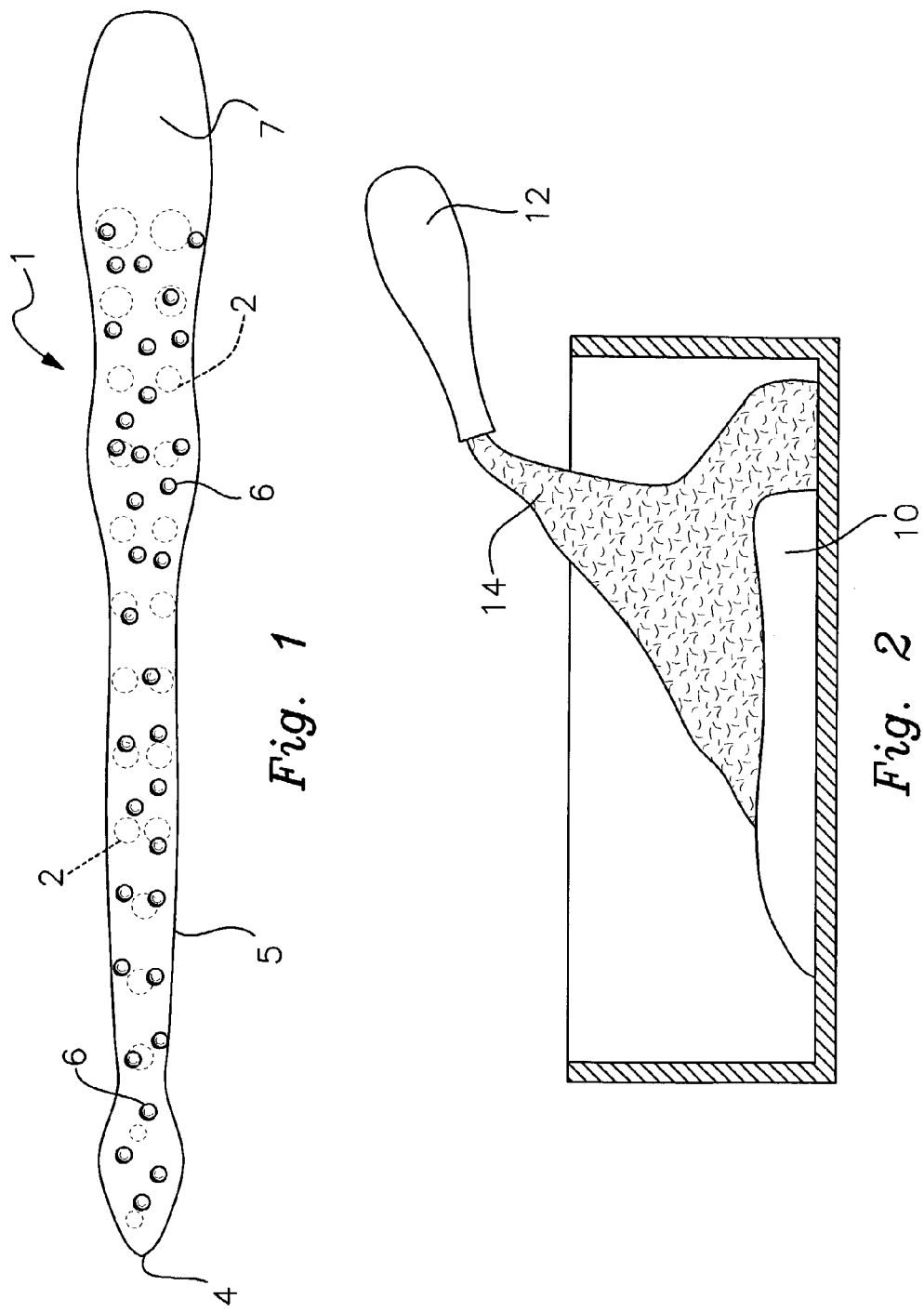

MOLDS FOR CASTING FISHING LURES AND OTHER PRODUCTS

This application is a division of U.S. application Ser. No. 10/116,937, which was filed on Apr. 8, 2002 now U.S. Pat. No. 6,678,992, which is a division of Ser. No. 09/802,771, which was filed on Mar. 12, 2001, and is now U.S. Pat. No. 6,408,567.

BACKGROUND OF THE INVENTION

This invention relates to fishing lures, and more particularly, to soft bodied fishing lures that float, and to molds for and methods of making floating fishing lures. Floating soft bodied fishing lures have been made by adding to plastic formulations chemicals that produce gas bubbles in the cured plastic. The resulting lures were tough and not natural feeling, and the colors were opaque and difficult to control. Also, air has been incorporated by agitating melted plastic before a lure body is formed, but the size, location and distribution of air bubbles in the lure can not be controlled. Selected areas of prior lures could not be made devoid of bubbles.

OBJECTIVES OF THE INVENTION

Accordingly, it is an object of this invention to provide improved fishing lures and improved molds for and methods of making the lures.

Another object is to encapsulate air bubbles in fishing lure bodies without diminishing the transparency or translucency of the plastic from which the lures are made.

An additional object is to provide floating fishing lures that have craters on their exterior surface for holding scenting and taste imparting agents.

Another object is to control the number and location of air bubbles in fishing lures.

An additional object is to provide fishing lures that have air bubbles in preselected locations but have no bubbles in other preselected areas.

A further object is to place differently sized air bubbles in different selected locations in fishing lures.

Another object is to provide methods and molds that can locate air bubbles only in predetermined portions of fishing lures and prevent the bubbles from forming in other predetermined portions of the lures.

A further object is to provide floating plastic fishing lures that are durable, economical, highly attractive to fish, easy to use, and which do not possess defects found in similar prior art lures.

A further object is to control the size of air bubbles in plastic fishing lures.

A further object is to provide improved methods for making the fishing lures described herein.

Another object is to provide porous molds that breathe and control the size and location of air bubbles in plastic fishing lures.

Other objects and advantages of the fishing lures and manufacturing methods and molds incorporating this invention will be found in the specification and claims and the scope of the invention will be set forth in the claims.

DESCRIPTION OF THE DRAWING

FIG. 1 is a schematic top plan view of a fishing lure in accord with this invention.

FIG. 2 is a schematic partially cross sectional side view of a step in a process of making fishing lures in accord with this invention.

DESCRIPTION OF THE INVENTION

Figure 3:
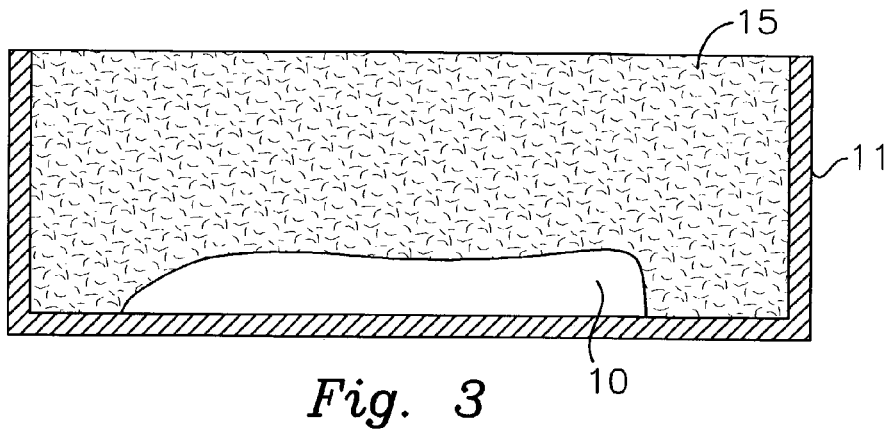
FIG. 3 is a schematic partially cross sectional side view of another step in the process of making fishing lures.

The drawing shows a soft natural feeling, flexible fishing lure 1 in accord with this invention. A number of spaced visible air bubbles 2 are encapsulated inside of the body of the lure. The air bubbles adjacent one end 3 of the lure may be a different size from the bubbles adjacent the other end 4. The upper surface 5 of the lure 1 may be essentially smooth and uninterrupted except that it may have randomly located pock marks or craters 6. A portion 7 of the lure at the end 3 may be solid and bubble free to facilitate impaling the lure on a hook or for connecting the lure to other rigging.

Preferably, the lure 1 is made from a soft, flexible, natural feeling synthetic plastic material, such as a thermoplastic plastisol resin formulation that includes polyvinyl chloride plasticized with esters of phathalate. It is also preferred that the lure body be colored and translucent or transparent so that the bubbles 2 are visible. However, natural and synthetic rubbers may be used for the body of lure 1 as may thermosetting synthetic plastics.

The lure 1 may be made by the process illustrated in FIGS. 2–10. In FIG. 2 a model 10 of the lure 1 has been placed on the bottom of a container 11. The model 10 may be shaped to resemble any aquatic or land creature upon which fish feed, or it may have an unnatural shape that provokes fish to strike. A supply 12 of uncured ceramic slip 14 is poured into the container embedding the model 10 in the slip. The slip 14 is allowed to cure around the model 10 and thus to produce the mold 15, as shown in FIG. 3. The cured slip must be porous and must have air entrained therein so that the body of mold 15 will be a breathing porous mass of pores and interstices that permit the passage of air there through. Mackie's premixed ceramic slip from Mackie Newton Ceramics, Inc. has been used to practice this invention.

Figure 4:
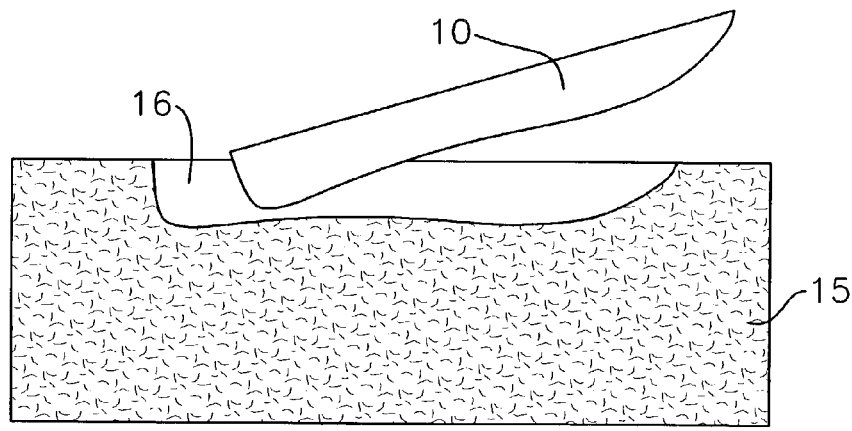
FIG. 4 is a schematic partially cross sectional side view of another step in the process of making fishing lures.
Figure 5:
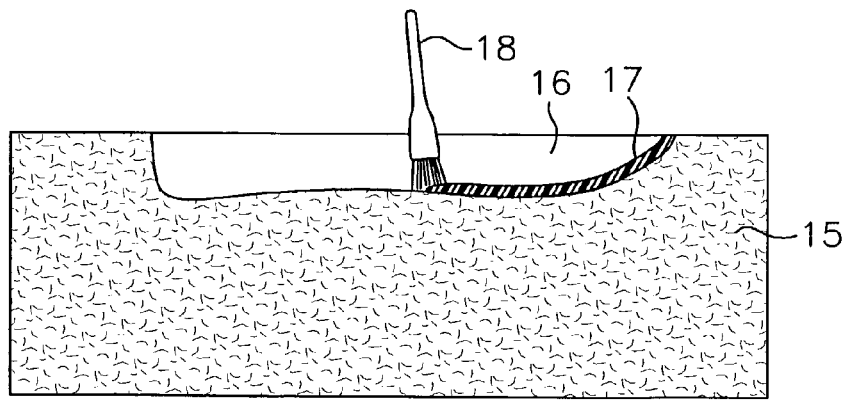
FIG. 5 is a schematic partially cross sectional side view of another step in the process of making fishing lures.

After the slip 14 has cured, the mold 15 is removed from the container 11, and the model 10 is removed from the body of the mold, as shown in FIG. 4. The space previously occupied by the model 10 defines the mold cavity 16 in which the lure 1 will be cast. The cavity 16 must be sealed by completely coating the cavity with a ceramic glaze 17 that is impervious to air. The glaze 17 may be applied by painting in on the surfaces of the cavity with a brush 19. After the glaze 17 has cured, it must seal the porous body of the mold 15 from contact with hot molten material from which the lure 1 will be cast. Duncan's 1N1001 clear Infinity premixed ceramic glaze has been used to practice this invention.

Figure 6:
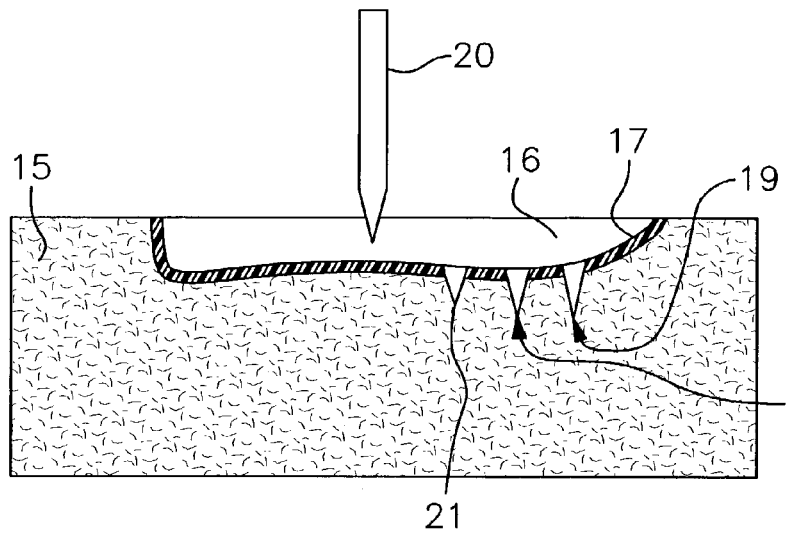
FIG. 6 is a schematic partially cross sectional side view of another step in the process of making fishing lures.

The seal produced by the cured glaze 17 must be broken by openings 19 that penetrate into the porous mold body. The openings 19 may be holes or scratches of any shape. As shown in FIG. 6, the cured glaze 17 may be punctured with a sharp tool 20, such as an awl or a needle, to produce circular holes 21 that penetrate through the glaze into the porous ceramic of the mold body. The tool 20 also may be used to scratch through the cured glaze. Alternatively, the holes 21 may be drilled through the glaze and into the mold body. This exposes the interior of the mold to the atmosphere when the cavity 16 is empty. It has been discovered that when the holes 21 are sized as disclosed herein, the air entrained in the porous mass of the mold 15 can be released into the body of the lure 1 during the casting process, and the molten plastic will not clog the holes 21. The holes 21 should be no larger than about 0.050 inches and no smaller than about 0.0001 inches.

Figure 7:
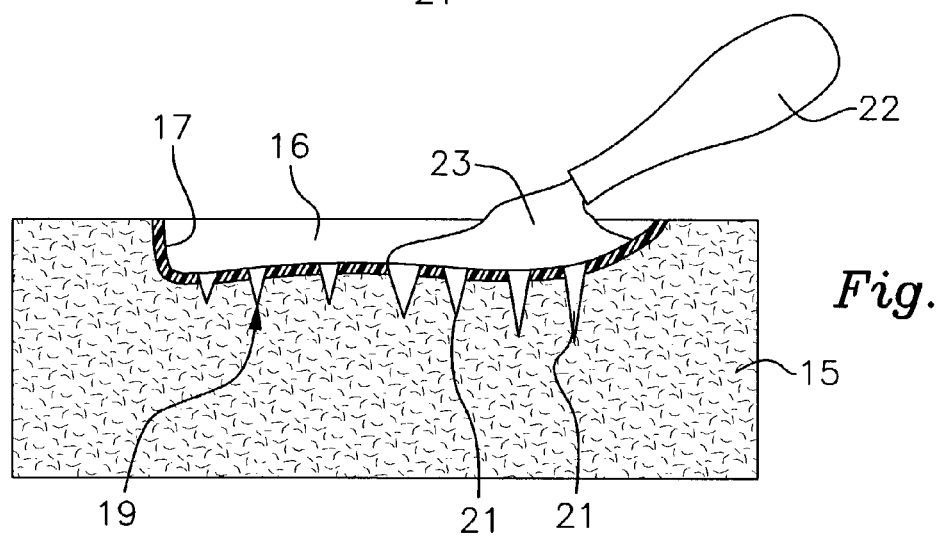
FIG. 7 is a schematic partially cross sectional side view of another step in the process of making fishing lures.
Figure 8:
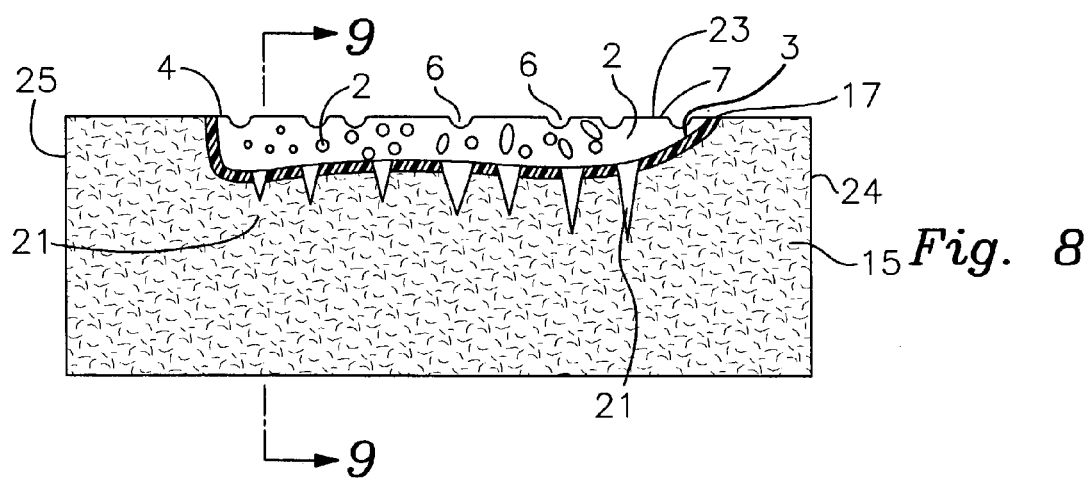
FIG. 8 is a schematic partially cross sectional side view of another step in the process of making fishing lures.
Figure 9:
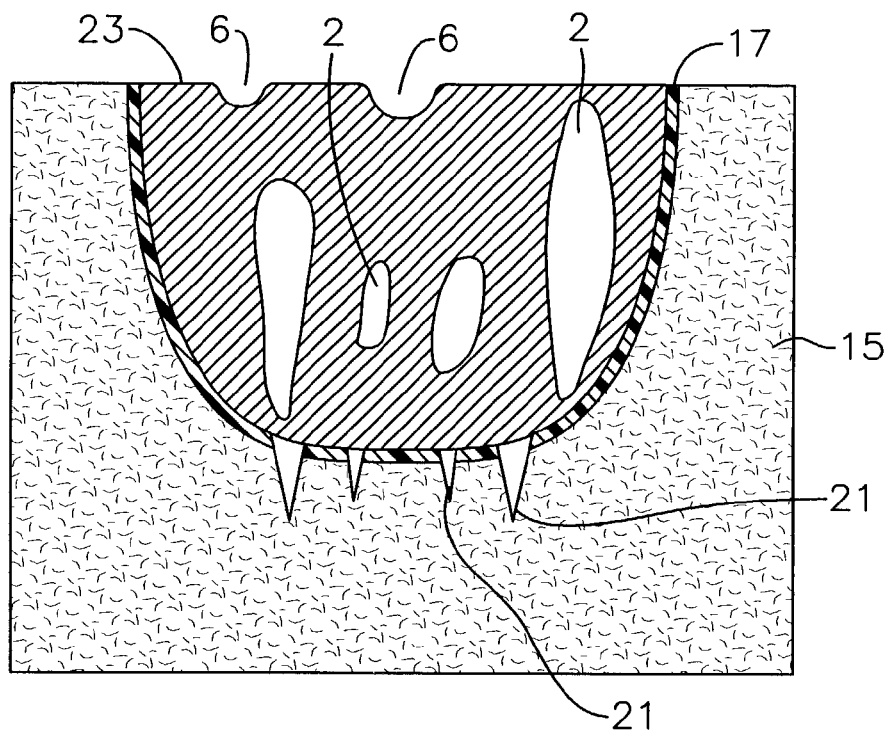
FIG. 9 is an enlarged cross sectional view taken generally along the line 9—9 in FIG. 8.

FIG. 7 shows a supply 22 of molten plastic resin 23 that has been heated to a preferred range of about 280 to about 400 degrees Fahrenheit being poured into the cavity 16. The cavity is essentially filled, as shown in FIGS. 8 and 9, and the resin is permitted to cure as it cools to about the ambient or room temperature. Air from the interior of the porous mold will rise into the molten plastic 23 and form the bubbles 2 therein. The air from inside the mold is pushed upwardly because the hot plastic in the above temperature range heats the mold and thus expands the entrained air. As the plastic cools down from this temperature range it has sufficient surface tension to prevent the liquid plastic from entering the holes 21. When the resin remains in the cavity 16 for up to about fifteen minutes until it cures at ambient or room temperature, bubbles 2 will be trapped or encapsulated within the body of the lure 1.

Figure 10:
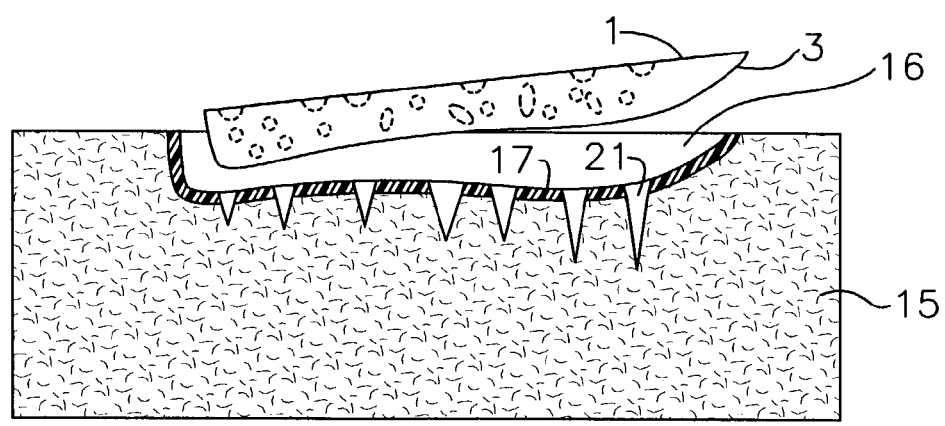
FIG. 10 is a schematic partially cross sectional side view of another step in the process of making fishing lures.

Some of the bubbles 2 will move upwardly through the liquid resin while it is curing until they burst through the upper surface 5. These eruptions will result in the craters 6 in the upper surface 5 of the lure. These craters 6 may be used by fishermen to hold scent or taste material on the lure 1. When the resin has finished curing, the lure 1 is removed from the cavity 16, as shown in FIG. 10. Since the porous ceramic interior of the mold 15 is now exposed to the atmosphere, ambient air enters the interior of the mold through the holes 21 and recharges the mold for creating bubbles 2 when the next lure 1 is cast.

The location of the bubbles 2 in the lure 1 can be controlled by predetermining the location of the holes 21 in the mold cavity 16. Holes may be selected within the preferred size range of about 0.0001 to about 0.050 inches to determine and control the size of the bubbles 2. For example, as shown in FIG. 8, the holes 21 adjacent the end 24 of the mold are larger than the holes 21 adjacent the opposite end 25. This results in the bubbles 2 at the corresponding end 3 of the lure body being a first general size that is larger than the second general size of the bubbles at the opposite end 4 of the lure. Similarly, FIG. 9 shows that relatively smaller holes 21 at the center of the mold result in smaller bubbles 2 at the center of the lure body than those produced by the larger holes 21 adjacent the outer edges of the mold. By thus controlling the size and location of the bubbles 2 within the body of lure 1, its buoyancy can be controlled. For example, one end or portion of the lure 1 may be made to float above a different end or portion of the lure. The action of the lure 1 as it is retrieved can also be influenced by controlling the size and location of the bubbles 2. There are no holes at the terminal end 24 so that there will not be any bubbles where the end 3 of the lure terminates. This makes the bubble-free end 3 stronger and better able to stay on a hook and resist the shearing forces that occur when a fish strikes the lure or when the lure snags.

Figure 11:
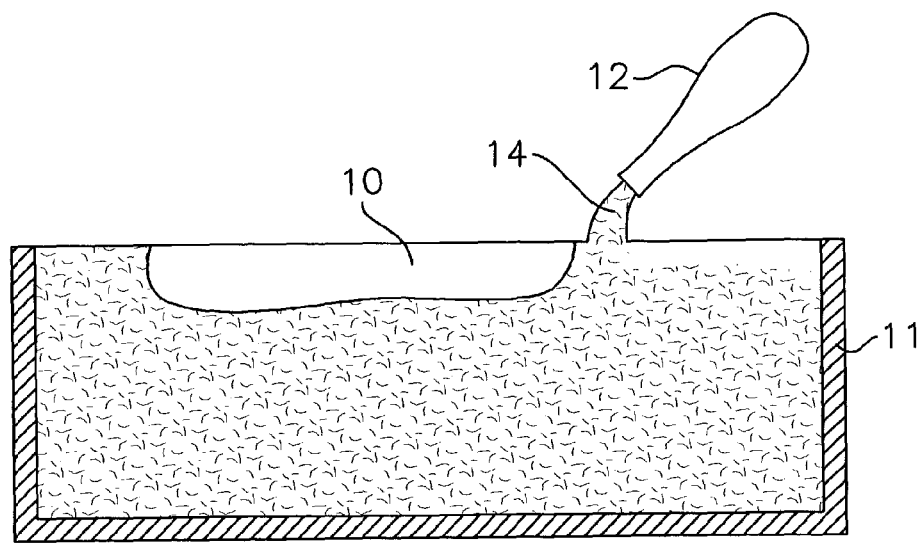
FIG. 11 is a schematic partially cross sectional side view of a step in another process of making fishing lures in accord with this invention.

FIG. 11 shows another embodiment of the invention that is identical to the above embodiment, except for the steps employed to create the cavity 16 in the mold 15. First a supply 12 of the uncured ceramic slip 14 is poured into the empty container 11 until the container is essentially filled. Then the model 10 of the lure is embedded by pressing it into the upper surface of the uncured slip 14. After the slip has cured, the model 10 is removed, and the remaining steps in the creation of the mold and the casting of the lure 1 are identical to those described above.

Figure 12:
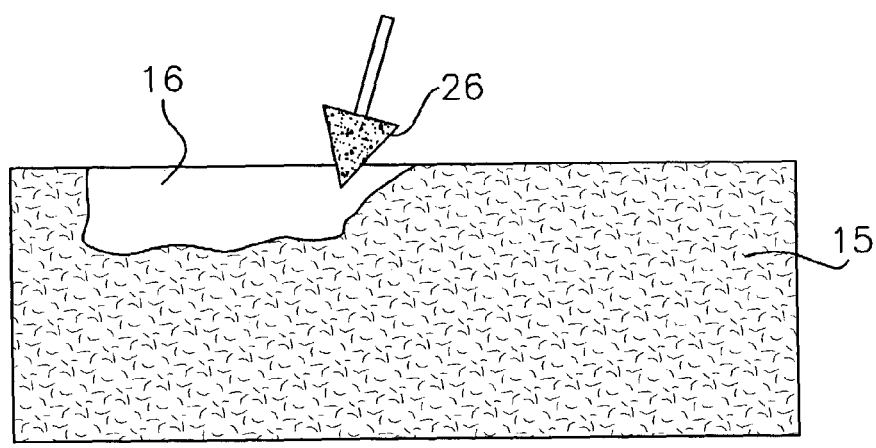
FIG. 12 is a schematic partially cross sectional side view of a step in another process of making fishing lures in accord with this invention.

FIG. 12 shows another embodiment of the invention that is identical to the above embodiments, except for the steps employed to create the cavity 16 in the mold 15. The slip 14 is poured into a container and allowed to cure as shown and described with references to FIG. 11 without embedding a model of the lure in the uncured slip. After the slip has cured, the body of the mold 15 is removed from the container and tools, such as a rotating burr 26 and/or hand chisels, are used to carve the cavity 16 in which the lure will be cast. The remaining steps in the creation of the mold and the casting of the lure 1 are identical to those described above.

While the present invention has been described with reference to particular embodiments and method steps, it is not intended to illustrate or describe all of the equivalent forms or ramifications thereof. For example, the lure body may be shaped to resemble any aquatic or land creature upon which fish feed, or the lure body may have any unnatural shape that provokes fish to strike. Also, the words used are words of description rather than limitation, and various changes may be made without departing from the spirit or scope of the invention disclosed herein. It is intended that the appended claims cover all such changes as fall within the true spirit and scope of the invention.

I claim:

1. A breathing mold for casting molten plastic into a floating fishing lure, comprising: a porous ceramic mold body having air entrained therein; a cavity in said mold body for receiving said molten plastic; a ceramic glaze coating said cavity and sealing the porous ceramic from which said mold body is made; and there being a plurality of spaced holes through said ceramic glaze that expose said porous ceramic body to the atmosphere and provide openings through which said entrained air can pass into said molten plastic and create bubbles in said molten plastic that enable said lure to float.

2. The mold for casting molten plastic into a floating fishing lure defined in claim 1, further comprising said holes through said ceramic glaze penetrating into said porous ceramic body.

3. The mold for casting molten plastic into a floating fishing lure defined in claim 1, further comprising said holes having a diameter in the range of from about 0.0001 to about 0.050 inches.

4. The mold for casting molten plastic into a floating fishing lure defined in claim 3, further comprising some of said holes having different sizes so as to produce bubbles of different sizes in said fishing lure.

5. The mold for casting molten plastic into a floating fishing lure defined in claim 4, further comprising some of said holes adjacent one end of said mold being larger than holes adjacent another end of said mold.

6. The mold for casting molten plastic into a floating fishing lure defined in claim 1, further comprising a portion of said mold being free from said holes so that a portion of said fishing lure cast in said portion of said mold will be free from air bubbles.

7. An atmospheric mold for casting molten plastic into a fishing lure body, comprising: a porous ceramic mold having air entrained therein; a cavity shaped to produce said lure body in said mold for receiving said molten plastic; a ceramic glaze coating said cavity, said ceramic glaze providing an air tight seal over the porous ceramic from which said mold is made; and there being a plurality of openings through said ceramic glaze that expose said porous ceramic mold to the atmosphere and provide passages through which said entrained air can pass into said molten plastic and create bubbles in said molten plastic that become encapsulated in said lure body when said molten plastic cures.

8. The atmospheric mold for casting molten plastic into a fishing lure body defined in claim 7, further comprising said openings through said ceramic glaze penetrating into said porous ceramic mold.

9. The atmospheric mold for casting molten plastic into a fishing lure body defined in claim 7, further comprising said openings having a dimension in the range of from about 0.0001 to about 0.050 inches.

10. The atmospheric mold for casting molten plastic into a fishing lure body defined in claim 7, further comprising some of said openings having different sizes so as to produce bubbles of different sizes in said fishing lure body.

11. The atmospheric mold for casting molten plastic into a fishing lure body defined in claim 7, further comprising some of said openings adjacent one end of said mold being larger than holes adjacent another end of said mold.

12. The atmospheric mold for casting molten plastic into a fishing lure body defined in claim 7, further comprising a portion of said mold being free from said openings so that part of said fishing lure body cast in said portion of said mold will be free from air bubbles.

13. The atmospheric mold for casting molten plastic into a fishing lure body defined in claim 12, wherein said portion of said mold that is free from said openings is located adjacent an end of said mold.

14. An open topped mold for encapsulating air bubbles into molten plastic cast into a product in said mold, comprising: a ceramic mold body comprising a breathing porous mass of pores and interstices that permit the passage of air therethrough, there being air entrained in said porous mass; a cavity shaped to produce said product in said porous mass for receiving said molten plastic; a ceramic glaze that is impervious to air coating said cavity and sealing said porous mass; and there being a plurality of openings through said ceramic glaze that expose said porous mass to the atmosphere and provide passages through which said entrained air can pass into said molten plastic and create bubbles in said molten plastic that become encapsulated in said product when said molten plastic cures.

15. The open topped mold for casting molten plastic into an air bubble containing product defined in claim 14, further comprising said openings through said ceramic glaze penetrating into said porous mass below said cavity so that air bubbles move upwardly into said molten plastic.

16. The open topped mold for casting molten plastic into an air bubble containing product defined in claim 14, further comprising said openings having a dimension in the range of from about 0.0001 to about 0.050 inches.

17. The open topped mold for casting molten plastic into an air bubble containing product defined in claim 14, further comprising some of said openings having different sizes so as to produce bubbles of different sizes in said product.

18. The open topped mold for casting molten plastic into an air bubble containing product defined in claim 14, further comprising some of said openings adjacent one end of said mold being larger than holes adjacent another end of said mold.

19. The open topped mold for casting molten plastic into an air bubble containing product defined in claim 14, further comprising a portion of said mold being free from said openings so that part of said product cast in said portion of said mold will be free from air bubbles.

20. The open topped mold for casting molten plastic into an air bubble containing product defined in claim 19, wherein said portion of said mold that is free from said openings is located adjacent an end of said mold.

* * * * *